April 3, 1951 D. P. HYNES ET AL 2,547,394
PRESSURE FITTING FOR TUBE JOINTS
Filed July 24, 1948
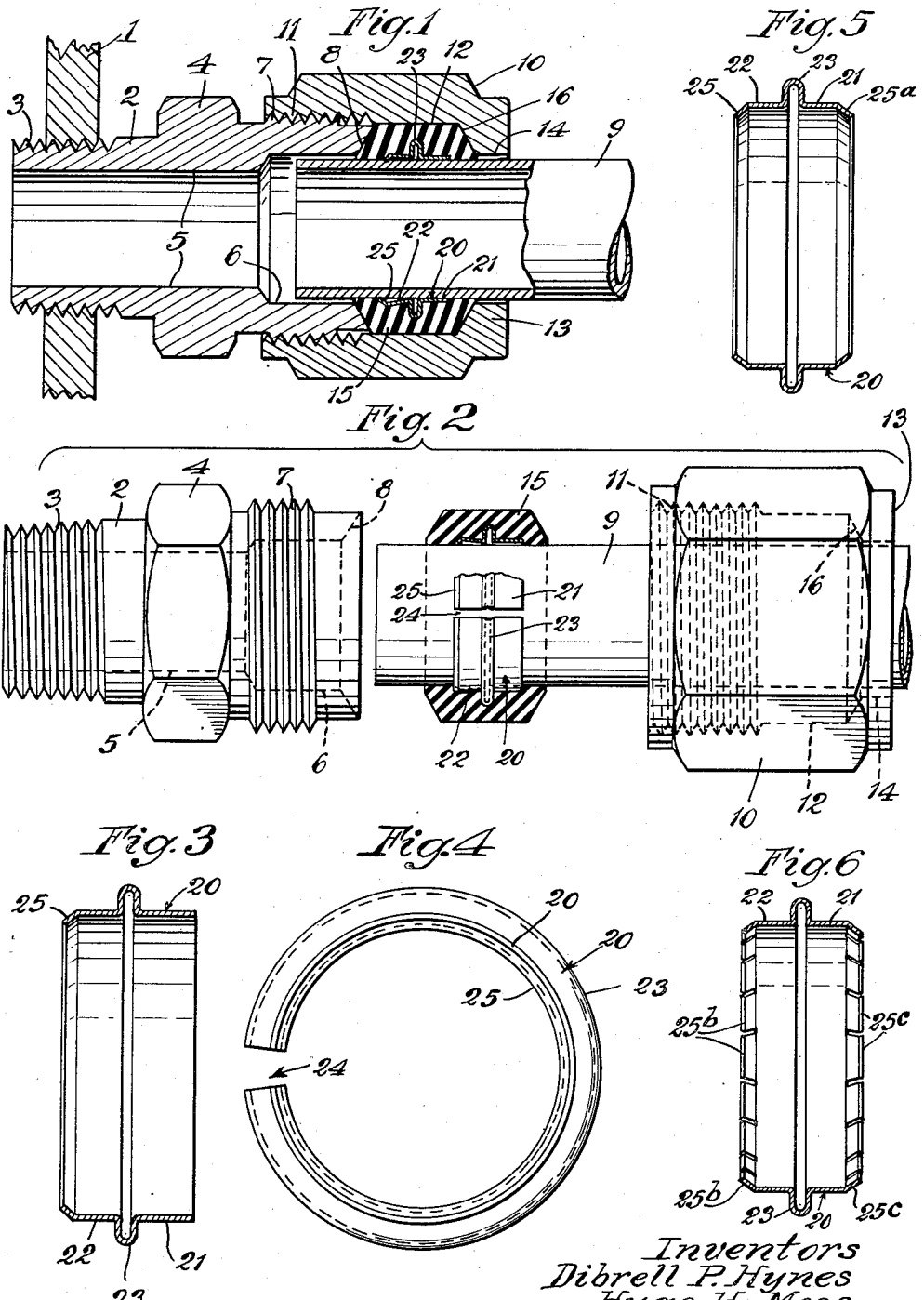
Inventors
Dibrell P. Hynes
Hugo H. Moss
by Parker & Carter
Attorneys.

Patented Apr. 3, 1951

2,547,394

UNITED STATES PATENT OFFICE 2,547,394

PRESSURE FITTING FOR TUBE JOINTS

Dibrell P. Hynes and Hugo H. Moss, Chicago, Ill., assignors to Chicago Forging & Manufacturing Company, Chicago, Ill., a corporation of Delaware Application July 24, 1948, Serial No. 40,483

2 Claims. (Cl. 285—166)

The invention relates to an improvement in tube connections and has for one purpose to provide improved connecting means for tubing or pipes.

Another purpose is to provide connecting means for tubing or pipes having relatively thin walls.

Another purpose is to provide a fluid tight connection for tubing, which includes an elastic member and provides a limited universal movement of the tubing, cushioning the tubing against vibration and metal fatigue.

Another purpose is to provide an improved anchorage ring adaptable for use with joints of the above described type.

Another purpose is to provide an improved anchorage ring adapted to be secured to the tube in response to the compression to which a resilient or elastic member surrounding the anchorage ring is subjected.

Another purpose is to provide such an achorage ring which may be forced along the tubing to a predetermined position before the joint is tightened, but which is firmly positioned on the tubing in response to the tightening of the joint, and resists retrograde movement.

Other purposes will appear from time to time in the course of the specification and claims.

The invention is illustrated more or less diagrammatically in the accompanying drawings wherein:

Figure 1 is an axial section;

Figure 2 is a side elevation of the parts of the joint, in separated or skeletonized position, with parts broken away and parts in axial section;

Figure 3 is a longitudinal section on an enlarged scale through the anchorage ring employed;

Figure 4 is an end elevation of the anchorage ring;

Figure 5 is a longitudinal section through a variant form of anchorage ring; and Figure 6 is a similar section through another form of anchorage ring.

Like parts are indicated by like symbols throughout the specification and drawings.

Referring to the drawings, 1 generally indicates any suitable member to which the tube connection may be secured. The connection proper includes the fitting generally indicated as 2, outwardly screw-threaded as at 3, and provided with a hexagonal or multi-faced portion 4, of increased diameter. 5 indicates the cylindrical inner wall of the bore through the fitting. The bore is outwardly expanded or increased in diameter at the outer end of the fitting, as at 6. The portion of the fitting surrounding the larger diameter of the bore is outwardly screw-threaded, as at 7. The end of the fitting is shown as conically concave, as at 8. 9 indicates the end of a tube or pipe, shown as extending within the bore 6. The pipe end is surrounded by the nut 10 with its internal threading 11 in mesh with the external thread 7 of the fitting 2. The nut has an inwardly cylindrical bore 12 and terminates in an end wall 13 apertured, as at 14, to permit the passage of the tube 9. The diameter of the aperture 14 slightly exceeds the external diameter of the tube 9. 15 illustrates a mass or washer of flexible, resilient, compressible material. It may be initially proportioned to conform to the walls of a pressure chamber which is defined by the exterior of the tube 9, a conic end wall 8 of the fitting 2, the cylindrical bore 12 of the nut 10 and the tapered or conical inner face 16 of the end wall 13 of the nut. It will be understood that when the mass 15 is subjected to pressure by running up the nut 10 on the fitting 2, the mass 15 substantially entirely or entirely fills the pressure chamber thus formed. It also serves to prevent any metal-to-metal contact between the tube 9 and the surrounding parts of the joint. However, it is vitally important positively to anchor the mass or sealing ring 15 on the tube. It is important that the anchorage ring be made of such form that it must be forced on the tube and along the tube to the desired position. Because the ring is made so that it has an initial bite it holds its position until firmly locked against movement along the tube in response to compression of the sealing mass 15. It is further important that no special tool or equipment be necessary for applying the abutment.

The desired result is obtained by employing a split ring generally indicated as 20, and shown in detail, in its expanded position, in Figures 3 and 4. The ring may include generally cylindrical portions 21 and 22 connected by an outward fold or bend 23. Preferably, the exterior diameter of the folds 23 exceeds the inner diameter of the aperture 14 of the nut 10. The ring is split, as shown at 24 in Figures 2 and 4. The outer edge of at least one of the portions 21 and 22 is preferably formed to provide a gripping connection with the exterior of the tube 9.

Illustrated herein is an inwardly bent edge flange or lip 25 which constitutes a gripping element which can grasp or bite into the surface of the tube 9. The ring is preferably of a metal harder than that of the tube. Preferably, the lip 25 is used on one edge only of the ring, but the invention is not limited to such use. Where the outer edge of the portion 21 is left cylindrical, as shown in Figure 3, it permits the ready application of the abutment or ring to the end of the tube. When it is applied, the lip 25 drags along the tube. However, even if the mass 15 is not subjected to pressure, there is definite resistance to retrograde movement of the abutment ring 20 toward the end of the tube.

When the sealing ring is applied, as shown in Figure 2, and when the nut 10 has been tightened up, as shown in Figure 1, then the pressure to which the mass 15 is subjected is effective to clamp the abutment ring 20 firmly into the surface of the tube. The compression in practice, holds the abutment ring so tightly against the outer surface of the tube 9 that the lip 25 may dig into the surface of the tube and strongly resist any tendency of the ring 20 to be moved toward the end of the tube. The parts are preferably so proportioned that the gap 24 is never entirely closed, the opposed edges of the ring 20, which bound the gap 24, never coming into abutting or contact relationship.

Referring to the form of Figure 5, we illustrate an anchorage ring which may be identical with Figures 3 and 4 but which has an additional lip 25a at the end of the ring opposite to the lip 25.

Figure 6 illustrates an anchorage ring which is basically the same as the anchorage ring of Figure 5 except that the lips 25 and 25a of Figure 5 are separated into separate teeth, 25b and 25c, along opposite ends of the ring.

It will be realized that whereas a practical and operative device is herein described and illustrated, nevertheless many changes in size, shape, number and disposition of parts may be made without departing from the spirit and intent of the invention. It is therefore desired that the description and showing herein be taken as in a broad sense illustrative or diagrammatic, rather than as a limitation to the precise showing herein.

The use and operation of the invention are as follows:

We provide a joint which will stand high pressures. The mass 15, when the nut 10 is run up on the fitting tube, is subjected to sufficient pressure to lock the abutment ring 20 firmly in place. When so locked, it serves as an anchorage which efficiently resists any tendency of the tube 9 to slip out of the connection or any tendency of the connection to be removed unintentionally from the end of the tube 9. The pressure which is necessary to tighten up the joint is itself employed also to lock the abutment or anchorage in place. No special tool is needed, and no additional operation.

It will be understood that the ring or abutment is preferably so shaped that the portions 21 and 22 respond freely to the inward compression to which they are subjected by the compressed mass 15. The split or division 24 is important. While the members 21 and 22 need not be strictly cylindrical, their general flatness, in axial section, is advantageous, as preventing any bridging or resistance to the pressure exerted through the mass 15. Whereas we have shown the mass 15 as a single piece, it will be understood that it may be assembled of a plurality of separate pieces.

It is advantageous that the ferrule or anchorage ring be made of thin spring-like stock, so that it can be forcibly sprung on the tubing and, when sprung on the tubing, will grip it with a spring action. It is preferably of material composed or tempered to be harder than the tube with which it is used. For example, the anchorage ring may be of steel, stainless steel, beryllium-copper, or other suitable metal or alloy. As will be clear from Figure 2, it is advantageous to have the ring so sprung or biased that when it is applied to the end of the tube 9, the initial entry of the ring about the tube will cause the biting edge or teeth to engage the tube end.

An advantageous use of the invention consists in supplying the ferrule or abutment or split ring assembled in the sealing ring 15, the combined ferrule and sealing ring being supplied as a unit, and being ready to apply to the tube.

All forms of the anchorage ring herein shown have in common the characteristic that they can be sprung on the tube, without the use of special tools. However, when they reach a predetermined position on the tube they can be left in that position and will not slide out of it and cannot be accidentally displaced. They are not freely slidable along the tube. The form of Figures 3 and 4 is perhaps more easily applied to the tube than the other forms. All the forms can be readily sprung into position about the tube and, when so sprung, can be forced or moved along the tube with adequate facility to permit an operator to force them without the use of a special tool. When the compression chamber formed by the members 2 and 10 is tightened, then the split lips of the form herein shown serve as thoroughly adequate positioning or abutment rings for preventing longitudinal movement of the ceiling ring 15 or of the rest of the fitting.

It will be understood that it is advantageous in all forms of the anchorage ring to have the terminal lips or flanges or teeth relatively sharp and of material harder than the material of the tube to be gripped.

We claim:

1. For use with tube fittings comprising a compression chamber and an elastic sealing means, a split ferrule having an edge portion of smaller inside diameter than the outside diameter of the tubing, the ferrule being formed and adapted to exert an initial grip on the tubing, and being adapted, on tightening of the fitting, to bite into the surface of the tubing, thus anchoring the fitting to the tubing, said ferrule having an outwardly extending circumferential projection surrounded by said elastic sealing means, said edge portion terminating in a generally continuous lip, said lip being adapted to contact the surface of the tubing at every point on said lip.

2. The structure of claim 1 characterized in that the ferrule terminates at one end in an edge of a diameter not less than the outside diameter of the tubing.

DIBRELL P. HYNES.
HUGO H. MOSS.

REFERENCES CITED

The following references are of record in the file of this patent:

UNITED STATES PATENTS

| Number | Name | Date |
|---|---|---|
| Re. 22,713 | Howe | Jan. 22, 1946 |
| 1,440,207 | Burn | Dec. 26, 1922 |
| 1,802,572 | Phillips | Apr. 28, 1931 |
| 1,822,056 | Noble | Sept. 8, 1931 |
| 2,288,506 | White | June 30, 1942 |
| 2,475,026 | Hynes et al. | July 5, 1949 |